(12) United States Patent
Kunishima

(10) Patent No.: US 8,357,410 B2
(45) Date of Patent: Jan. 22, 2013

(54) FROZEN DUMPLINGS

(75) Inventor: Koichi Kunishima, Portland, OR (US)

(73) Assignee: Ajinomoto Frozen Foods USA, Inc., Portland, OR (US)

( * ) Notice: Subject to any disclaimer, the term of this patent is extended or adjusted under 35 U.S.C. 154(b) by 1738 days.

(21) Appl. No.: 11/379,077

(22) Filed: Apr. 18, 2006

(65) Prior Publication Data

US 2006/0263489 A1 Nov. 23, 2006

Related U.S. Application Data

(60) Provisional application No. 60/673,793, filed on Apr. 22, 2005.

(51) Int. Cl.
*A23L 1/48* (2006.01)
*A23L 1/40* (2006.01)

(52) U.S. Cl. .......................... 426/100; 426/589

(58) Field of Classification Search ................... 426/549, 426/100, 589
See application file for complete search history.

(56) References Cited

U.S. PATENT DOCUMENTS 4,830,867 A * 5/1989 Uemura et al. ............... 426/557
2005/0118307 A1 * 6/2005 Gonda et al. .................. 426/100

FOREIGN PATENT DOCUMENTS

| JP | 3041622 | | 7/1997 |
| JP | 2850690 | | 11/1998 |
| JP | 2001-258518 | * | 9/2001 |
| JP | 2001-258518 A | * | 9/2001 |
| JP | 2003-000204 | | 1/2003 |

OTHER PUBLICATIONS

Refusal Reason Notification for Japanese Patent App. No. 2006-116998 (Aug. 9, 2010).

* cited by examiner

*Primary Examiner* — D Lawrence Tarazano
*Assistant Examiner* — Jerry W Anderson
(74) *Attorney, Agent, or Firm* — Cermak Nakajima LLP; Adam J. Cermak

(57) ABSTRACT

A frozen dumpling is obtained by applying to a dumpling, a first layer of a batter, and a second layer of water or a seasoning solution, wherein the first layer is present in an amount of 5 to 30% by weight relative to the dumpling, and the second layer is present in an amount of 20 to 100% by weight relative to the dumpling, and then freezing the dumpling. Tray-packed frozen dumplings are obtained by placing the dumplings on a tray, and contacting the dumplings with a first layer of batter, and a second layer of water or a seasoning solution, and freezing the dumplings, wherein the first layer is present in an amount of 5 to 30% by weight relative to the dumpling, and the second layer is present in an amount of 20 to 100% by weight relative to the dumpling.

13 Claims, No Drawings

FROZEN DUMPLINGS

This application claims priority under 35 U.S.C. §119(e) to U.S. Provisional Patent Application 60/673,793, filed Apr. 22, 2005, the entirety of which is incorporated by reference.

BACKGROUND OF THE INVENTION

1. Field of the Invention

The present invention relates to frozen dumplings which are obtained by adding water or seasoning solution to the dumplings prior to freezing. As a result, perfectly prepared, succulent, supple-skinned dumplings can be obtained during cooking without having to add a specific amount water.

2. Brief Description of the Related Art

Dumplings are commonly cooked by placing raw, steamed, or frozen dumplings in an iron frying pan which has been coated with oil, adding a certain amount of water, covering the pan, and allowing them to cook.

Although the right degree of browning can be achieved using the above method, there is a risk of the water flying out of the pan when the water is added. Furthermore, the skillful cooking of dumplings requires great practice, and can also be tedious when having to repeatedly add water to a hot frying pan, and therefore repeatedly removing and replacing the lid. Therefore, a method is desirable which allows for an even, easy cooking and freezing process for dumplings while not effecting the flavor or appearance.

SUMMARY OF THE INVENTION

The present invention relates to production of attractive, succulent frozen dumplings. The present invention further relates to a method of producing dumplings that does not require the tedious operations of adding oil and water during cooking in a frying pan, and repeatedly putting on and taking off a lid.

The present inventors conducted extensive research into solving the above-stated problem, resulting in the discovery that by taking dumplings that had been battered, followed by misting with a certain amount of water or seasoning solution, and then freezing, even a novice can simply prepare succulent dumplings.

It is an object of the present invention to provide a frozen dumpling obtained by applying to a dumpling a first layer comprising a batter, and a second layer comprising water or a seasoning solution, wherein the first layer is present in an amount of 5 to 30% by weight relative to the dumpling, and the second layer is present in an amount of 20 to 100% by weight relative to the dumpling, and then freezing the dumpling.

It is a further object of the present invention to provide the frozen dumpling as described above, wherein said second layer is present in an amount of 30 to 60% by weight relative to the dumpling, and then freezing the dumpling.

It is a further object of the present invention to provide tray-packed frozen dumplings obtained by placing dumplings on a tray, and applying to the dumplings a first layer comprising a batter, and a second layer comprising water or a seasoning solution, wherein the first layer is present in an amount of 5 to 30% by weight relative to the dumpling, and the second layer is present in an amount of 20 to 100% by weight relative to the dumpling, and freezing the dumplings.

It is a further object of the present invention to further provide the above tray-packed frozen dumplings described above, wherein said second layer is present in an amount of 30 to 60% by weight relative to the dumplings.

It is a further object of the present invention to provide the above tray-packed frozen dumplings, wherein two or more dumplings are placed on said tray, and are joined by a first layer comprising a batter and a second layer comprising water or a seasoning solution.

It is a further object of the present invention to provide the above frozen dumplings, wherein said batter comprises 50 to 80% water, 5 to 30% oil, 0.6 to 8% emulsifier, 6 to 10% starch, and 0.1 to 0.7% protein, and wherein said batter does not contain grain flour.

It is a further object of the present invention to provide the above frozen dumplings, wherein said seasoning solution has a viscosity of 0 to 6,000 cps, preferably 0 to 3,000 cps, as measured by a type B viscometer.

It is a further object of the present invention to provide a method of producing a frozen dumpling comprising applying to a dumpling a first layer comprising a batter, and a second layer comprising water or a seasoning solution, wherein the first layer is present in an amount of 5 to 30% by weight relative to the dumpling, and the second layer is present in an amount of 20 to 100% by weight relative to the dumpling, and freezing said dumpling.

DETAILED DESCRIPTION OF EXEMPLARY EMBODIMENTS

The present invention relates to attractive, succulent dumplings that can be simply and quickly prepared in a frying pan.

Exemplary modes of implementing the present invention are described below.

According to an embodiment of the disclosed subject matter, the dumpling has been frozen during processing, irrespective of the shape or method of preparation of the dumpling. Typically, the dumplings are crescent-shaped. The method of manufacturing the dumpling is not specifically limited, and methods of preparing the ingredients and dough skin that are known to those skilled in the art may be employed.

The composition of the batter employed is not critical. The batter should solidify upon freezing, prevent the dumplings from sticking to the frying pan during cooking, and form a crispy, thin layer, or shell-like crust around the dumpling when applied. The composition of the batter is desirably 50 to 80% water, 5 to 30% oil, 0.6 to 8% emulsifier, 6 to 10% starch, and 0.1 to 0.7% protein. Also, the batter composition should not contain any grain flour.

The water employed in the batter composition can be present in an amount of 50 to 80%, preferably 65 to 77%.

The oil employed in the batter composition can be present in an amount of 5 to 30%, preferably 10 to 30%, and more preferably, 15 to 25%. The type of oil is not specifically limited, other than that it is edible. The physical properties of the oil may be such that it is liquid or solid at room temperature. Examples include, but are not limited to, vegetable oil, soybean oil, corn oil, palm oil, shortening, butter, sesame oil, and olive oil.

The emulsifier employed in the batter composition can be present in an amount of 0.6 to 8%, preferably 1 to 4%, and more preferably, 1 to 3%. The type of emulsifier is not specifically limited, other than that it is edible. Examples include, but are not limited to, lecithin (derived from soybean, egg, or the like), enzymatically degraded lecithin, sugar esters, monoglycerides, polyglycerin fatty acid esters, and polypropylene glycol fatty acid esters.

The starch employed in the batter composition can be present in an amount of 6 to 10%, preferably 6.5 to 8.5%. The type of starch is not specifically limited, other than that it is edible. Examples include, but are not limited to, nonglutinous rice starch, glutinous rice starch, wheat starch, cornstarch, waxy cornstarch, tapioca starch, mung bean starch, potato starch, and sweet potato starch.

The protein employed in the batter composition can be present in an amount of 0.2 to 0.6%. The type of protein is not specifically limited, other than that it is edible. Examples include, but are not limited to, albumin powder, separated soy protein, defatted powdered milk, powdered wheat protein, and dried whole egg powder. Of these, albumin powder is preferred from the perspective of flavor.

The absence of grain flour is a characteristic of the batter. Herein, the term "grain flour" means simple ground grain flour. Specific examples include wheat flour, rice flour, corn flour, barley flour, buckwheat flour, potato flour, soybean flour, adzuki flour, millet flour, chestnut flour, and Chinese millet flour. When grain flour is employed, it is impossible to control the amount of protein and starch in the grain flour, nor can the effects of trace components such as cellulose be ignored. Thus, grain flour is undesirable because it contains starches and proteins which incorporate different combinations of properties, making it difficult to adjust the properties of the crust created by the batter.

The seasonings employed in the batter composition are not specifically limited. Soy sauce, salts, amino acids, and the like may be added. So long as they are not in the form of grain flour, items such as gums and cellulose can be added as thickeners and texture-adjusting agents.

The water employed can be adsorbed by the dough skin of the dumpling while it is cooking in the frying pan. The term "water" as used here is not specifically limited, other than that it is potable water. It does not have to be pure water. For example, tap water and mineral water can be employed.

The seasoning solution or broth employed can be any flavored or seasoned aqueous solution. For example, the term "seasoning solution" refers to a flavored aqueous solution that can be ingested, the viscosity of which is 0 to 6,000 cps, preferably 0 to 3,000 cps, as measured by a type B viscometer. so long as it imparts body and succulence to the dough skins. The composition of the seasoning solution is not critical, as long as the proper texture is imparted to the dough skin.

The term "tray" as employed is defined as follows. The shape and material of the tray are not specifically limited, but due to cost considerations, a simple shape is desirable. A shape with a flat bottom is preferred. The material can be any material which is typically employed for food containers. If paper is used, waterproofing is required.

A frozen dumpling can be obtained by applying to a dumpling which has been prepared in by a typical method, a first layer which includes a batter, and a second layer which includes water or a seasoning solution, wherein the first layer is present in an amount of 5 to 30% by weight relative to the dumpling, and the second layer is present in an amount of 20 to 100%, preferably 30-60% by weight relative to the dumpling, and then freezing the dumpling. The reason the quantity of water or seasoning solution is 20 to 100 percent, preferably 30 to 60 percent, by weight relative to the dumpling is that if the amount of water or seasoning solution is below this level, the dough skin does not have adequate water during cooking, which produces a stiff texture. When the water or seasoning solution is present in greater than this amount, not only does an excessively soggy texture result, but a long period of cooking is required to evaporate the water in the frying pan.

The thickness of the first layer of batter joining and securing the dumplings is desirably not greater than half the height of the dumplings. This is because a thickness of not greater than half the height of the dumplings is necessary to form a good crust and achieve a good texture.

When arranging the dumplings in a tray, the number of dumplings is desirably not less than two.

The term "frozen" is used to mean a temperature of −5° C. or less. So that quality is not compromised, a temperature of −18° C. or less is desirable. The freezing temperature depends on the performance of the freezer, but normally falls within the range of −45 to −5° C. It is important in the implementation of the present invention that the batter be in a frozen state at the freezing temperature.

The formation of a good crust means a thin and adequately broad crust. The texture of a good crust in the present invention means a texture with adequate body and crispiness. During cooking, one side of the dumplings will brown since no turning or addition of water or oil is required.

The shape of the tray is not specifically limited. However, due to cost considerations, a simple shape is desirable and a shape with a flat bottom is preferred.

In the present invention, good dough skin texture means a texture which has adequate body and thin crispiness, and is free of undesirable, plastic chewiness.

EXAMPLES

The present invention is described in greater detail through the following non-limiting examples. In the following description, percentages indicate percentages by weight unless stated otherwise.

Preparation of Control Batter:

The control batter had the following composition: 64.6% water, 25% oil ("Natane (Canola) oil" made by Ajinomoto Seiyu K.K.), 2% emulsifier (soybean lecithin made by Ajinomoto Seiyu K.K.), 8% starch (wheat starch), and 0.4% protein (albumin powder).

All of the above ingredients except the oil and emulsifier were added to the water, and the mixture was stirred in a ball mixer. The emulsifier was dissolved in the oil, and this solution was then gradually added and mixed into the water mixture. When the amounts of the starting materials are altered in the following examples, the difference in the amounts of the starting materials was adjusted for with water.

The dumplings were organoleptically evaluated as follows. Twelve dumplings weighing 20 g each for a total of 240 g were placed on a tray with a flat bottom and packed with a total of 12 g of batter, with an average of 1 g of batter per dumpling. The dumplings were hot steamed to cook and sterilize them, and various quantities of water were poured into the trays. Then, the trays were thoroughly frozen to −35° C. in a freezer, and the resulting dumplings were used in the following examples. In the following examples, the dumplings were removed from the tray along with ice and batter and placed in a frying pan which was 26 cm in diameter. A lid was placed on the frying pan, and the dumplings were cooked at medium heat for seven minutes, which allowed for evaporation of the remaining water. The dumplings do not have to be turned during cooking, which results in the browning of one side (see FIG. 1). The texture, appearance, and overall score were organoleptically evaluated using the following scale: the ⊚ symbol represents the best result, the ○ represents a better result, the Δ represents a worse result, and the x represents the worst result. The evaluations in the following examples are average value by three persons. The crust which formed was that obtained using a frying pan 26 cm in diameter.

Example 1

The Effect of the Quantity of Water on Cooking Properties and Texture

Various quantities of water from 0 to 20, 40, 70, 110, 150, 200, 240, 260, and 300 g, were added and sensory evaluation was conducted after cooking. The results are given in Table 1.

TABLE 1

| Quantity of water added | Sensory evaluation | Comments |
|---|---|---|
| 0 g | x | Hard dough skins |
| 20 g | x | Hard dough skins |
| 40 g | Δ | Somewhat hard dough skins |
| 70 g | ○ | Somewhat hard dough skins, slightly burned |
| 110 g | ○ | Texture of dough skins was just right |
| 150 g | ⊙ | Texture of dough skins had body and was good |
| 200 g | ⊙ | Texture of dough skins had body and was good |
| 240 g | ○ | Dough skins was somewhat soft |
| 260 g | Δ | Dough skins was soft |
| 300 g | x | Dough skins was excessively soft and ruptured |

Based on the results shown in Table 1, when less than 40 g of water was added, there was insufficient water, burning occurred during cooking, and the texture of the dough skin was hard. At 260 g or more, an extremely long period was required for the water to evaporate off during cooking, the texture of the dough skin lacked body, and the dough skin was excessively soft. By contrast, at 70 to 240 g, there was no difficulty in getting rid of the water during cooking and the texture of the dough skin was good.

Example 2

The Effect of Seasoning Solution on the Flavor, Aroma, and Texture of Dumplings

The same test was conducted using a broth (seasoning solution) of the formula shown in Table 2, and using a control dumpling with only water added. The dumplings were frozen as described above. The results are given in Table 3.

TABLE 2

| Ingredient | Recipe | Source |
|---|---|---|
| Water | 1,000 g | — |
| Table salt | 3 g | N/A |
| Chicken broth | 7 g | Ajinomoto (Ltd.) |

TABLE 3

| Amount of broth added | Sensory evaluation | Comments |
|---|---|---|
| 0 g | x | Hard dough skins, no flavor |
| 20 g | x | Hard dough skins |
| 40 g | Δ | Somewhat hard dough skins |
| 70 g | ○ | Somewhat hard dough skins, slightly burned |
| 110 g | ○ | Texture of dough skins was just right |
| 150 g | ⊙ | Texture of dough skins had body and was good, flavor was good |
| 200 g | ⊙ | Texture of dough skins had body and was good, flavor was good |
| 240 g | ○ | Dough skins was somewhat soft |
| 260 g | Δ | Dough skins was soft |
| 300 g | x | Dough skins was excessively soft and ruptured |

Based on Table 3, the use of a seasoning (broth) solution yielded flavorful dumplings. The texture of the dough skins was extremely good, and the cooking properties were good.

While the invention has been described in detail with reference to exemplary embodiments thereof, it will be apparent to one skilled in the art that various changes can be made, and equivalents employed, without departing from the scope of the invention. Each of the aforementioned documents is incorporated by reference herein in its entirety.

I claim:

1. A frozen dumpling obtained by:
   A) applying to a dumpling, a first layer comprising a batter, wherein the first layer is present in an amount of 5 to 30% by weight relative to the dumpling;
   B) after step A), steaming the dumpling;
   C) after step B), applying to the dumpling a second layer comprising water or a seasoning solution, wherein the second layer is present in an amount of 20 to 100% by weight relative to the dumpling, and
   D) after step C), freezing the dumpling.

2. The frozen dumpling of claim 1, wherein the second layer is present in an amount of 30 to 60% by weight relative to the dumpling.

3. The frozen dumpling of claim 1, wherein said batter comprises 50 to 80% water, 5 to 30% oil, 0.6 to 8% emulsifier, 6 to 10% starch, and 0.1 to 0.7% protein, and wherein said batter does not contain grain flour.

4. The frozen dumpling of claim 1, wherein said seasoning solution has a viscosity of 0 to 6,000 cps, as measured by a type B viscometer.

5. Tray-packed frozen dumplings obtained by
   A) placing dumplings on a tray, and
   B) after step A), applying to said dumplings a first layer comprising a batter, wherein the first layer is present in an amount of 5 to 30% by weight relative to each dumpling;
   C) after step B), steaming the dumplings;
   D) after step C), applying to the dumplings a second layer comprising water or a seasoning solution, and wherein the second layer is present in an amount of 20 to 100% by weight relative to each dumpling, and
   E) after step D), freezing said dumplings.

6. The tray-packed frozen dumplings of claim 5, wherein said second layer is present in an amount of 30 to 60% by weight relative to the dumplings.

7. The tray-packed frozen dumplings of claim 5 wherein said batter comprises 50 to 80% water, 5 to 30% oil, 0.6 to 8% emulsifier, 6 to 10% starch, and 0.1 to 0.7% protein, and wherein said batter does not contain grain flour.

8. The tray-packed frozen dumplings of claim 5, wherein said seasoning solution has a viscosity of 0 to 6,000 cps, as measured by a type B viscometer.

9. The tray-packed frozen dumplings of claim 5, wherein two or more dumplings are placed on said tray, and are joined by a first layer comprising a batter and a second layer comprising water or a seasoning solution.

10. A method of producing a frozen dumpling comprising:
   A) applying to a dumpling a first layer comprising a batter, wherein the first layer is present in an amount of 5 to 30% by weight relative to the dumpling,
   B) after step A), steaming the dumpling,
   C) after step B), applying to the dumpling a second layer comprising water or a seasoning solution, wherein the second layer is present in an amount of 20 to 100% by weight relative to the dumpling, and
   D) after step C), freezing said dumpling.

11. The method of claim 10, wherein said second layer is present in an amount of 30-60% by weight relative to the dumpling.

12. The method of claim 10, wherein said batter comprises 50 to 80% water, 5 to 30% oil, 0.6 to 8% emulsifier, 6 to 10% starch, and 0.1 to 0.7% protein, and wherein said batter does not contain grain flour.

13. The method of claim 10, wherein said seasoning solution has a viscosity of 0 to 6,000 cps, as measured by a type B viscometer.

* * * * *